United States Patent
Menon

(12) United States Patent (10) Patent No.: US 6,341,296 B1
(45) Date of Patent: Jan. 22, 2002

(54) METHOD AND APPARATUS FOR EFFICIENT SELECTION OF A BOUNDARY VALUE

(75) Inventor: P. Reghavan Menon, Santa Clara, CA (US)

(73) Assignee: PMC-Sierra, Inc., British Columbia (CA)

( * ) Notice: Subject to any disclaimer, the term of this patent is extended or adjusted under 35 U.S.C. 154(b) by 0 days.

(21) Appl. No.: 09/300,357

(22) Filed: Apr. 27, 1999

Related U.S. Application Data

(60) Provisional application No. 60/083,297, filed on Apr. 28, 1998.

(51) Int. Cl.[7] .............................. G06F 7/00; G06F 7/50
(52) U.S. Cl. ...................... 708/207; 708/671; 340/146.2
(58) Field of Search .................................. 708/207, 671; 340/146.2

(56) References Cited

U.S. PATENT DOCUMENTS

| | | | | |
|---|---|---|---|---|
| 4,539,549 A | * | 9/1985 | Hong et al. .................. | 708/207 |
| 4,757,464 A | * | 7/1988 | Zimmermann et al. ...... | 708/207 |
| 4,760,374 A | * | 7/1988 | Moller ........................ | 708/207 |
| 4,774,688 A | * | 9/1988 | Kobayashi et al. .......... | 708/207 |
| 4,799,152 A | * | 1/1989 | Chuang et al. ............. | 708/207 |
| 4,967,349 A | * | 10/1990 | Kodama et al. ............ | 708/207 |
| 5,262,969 A | * | 11/1993 | Ishihara ....................... | 708/207 |
| 5,721,809 A | * | 2/1998 | Park ......................... | 340/146.2 |
| 6,115,725 A | * | 9/2000 | Shibata et al. .............. | 708/207 |

* cited by examiner

*Primary Examiner*—Tan V. Mai
(74) *Attorney, Agent, or Firm*—Townsend and Townsend and Crew LLP; Kenneth R. Allen

(57) ABSTRACT

In accordance with the present invention, a logic circuit identifies the maximum or minimum boundary values from a group of values and also designates the input value(s) which match the boundary values. The logic circuit includes a number of slice logic blocks and a common logic block. Each slice logic block processes one of the input values to determine if it is a maximum value. The common logic block, shared by all the slice logic blocks generates the boundary value.

10 Claims, 4 Drawing Sheets

METHOD AND APPARATUS FOR EFFICIENT SELECTION OF A BOUNDARY VALUE

This application claims priority from provisional patent application No. 60/083,297, filed on Apr. 28, 1998, which is incorporated herein by reference.

BACKGROUND OF THE INVENTION

The present invention relates generally to digital logic. More particularly, the invention relates to a method and apparatus for quickly identifying a lowest or highest boundary value from among a number of values. The invention has particular applications in the field of high-performance digital communications and has other applications.

In a number of digital logic applications, it is necessary to determine the highest value or lowest value number of a group of digitally-encoded numbers. In this application boundary value will be used to indicate either a highest or lowest value. One such application is determining cell or packet scheduling in a digital communications device. In such a device, cells, packets, buffers, or other entities, may each be assigned a number indicating their priority. A scheduling routing selects a cell, packet, buffer or other entity based on its priority value as compared with the priority values of other entities seeking service. In some applications, the priority values associated with a cell, packet, buffer, or other entity are referred to as tags.

Typically, this selection is accomplished using a tree of comparators. FIG. 1 illustrates a prior art method for determining a boundary value out of 16 numbers using four stages of comparators. In the first stage, numbers are paired (in many applications in a fixed order or essentially at random) and input into comparators 10. The boundary higher or lower value of each pair is passed to the next stage and the other value is discarded. For 16 tags, this process is repeated three more times, until one boundary value emerges.

This prior art device has a number of disadvantages. The first is that in a hardware implementation, each comparator is generally comprised of a large number of gates (usually XOR gates) and this consumes a large chip area. As is known in the art, the total chip area needed for a hardware implementation can be reduced by reusing compare elements for different stages, but doing so adds to the complexity of the circuit and increases processing time.

Two other related disadvantages are that it is difficult to determine if more than one of the initial tags is equal to the boundary value and it is difficult to signal to the initial tags or values which of them was selected as the boundary value. This is because the output of the final comparator 10a is simple an N bit number representing the boundary detected. While both of these difficulties can be address in a circuit such as FIG. 1, doing so requires additional feedback circuitry and can also require additional time for processing.

What is needed is a method and apparatus that can select one or more boundary values from a number of input values without the disadvantageous and limitations of prior art methods.

SUMMARY OF THE INVENTION

The present invention is a method and apparatus for quickly the maximum or minimum boundary value from a group of values that quickly indicates the output boundary value and indicates each input value that matched that boundary value.

In one embodiment, the invention is constructed of slice logic blocks, each block processing one of the input values to determine if it is a maximum value. A result block, shared by all the logic blocks, produces the boundary value.

The invention also comprises a method for selecting a boundary value by comparing all the bits in one input value to input bits and conditioned bits from other input values.

In a communications device, such as an ATM switch or routing table or other devices, the input values (in this embodiment referred to as tags) may represent a priority level and the device and method of the invention can be used to very quickly determine tags indicating the highest or lowest priority buffers or cells awaiting service.

The invention will be explained with respect to specific embodiments, but will be clear to those of skill in the art that the invention may be deployed in many alternative logic applications. The invention may also be deployed as described below for operation of a wide variety of communications devices. For the sake of clarity, the invention will be described in terms of specific examples. It is inherent in the art that logic devices and processes and communications devices can be highly variable in the arrangement and configuration of different components. These examples should therefore been taken as illustrations and not seen as limiting the invention and the invention should not be limited except as provided by the attached claims and allowable equivalents.

DESCRIPTION OF THE SPECIFIC EMBODIMENTS

Figure 1:
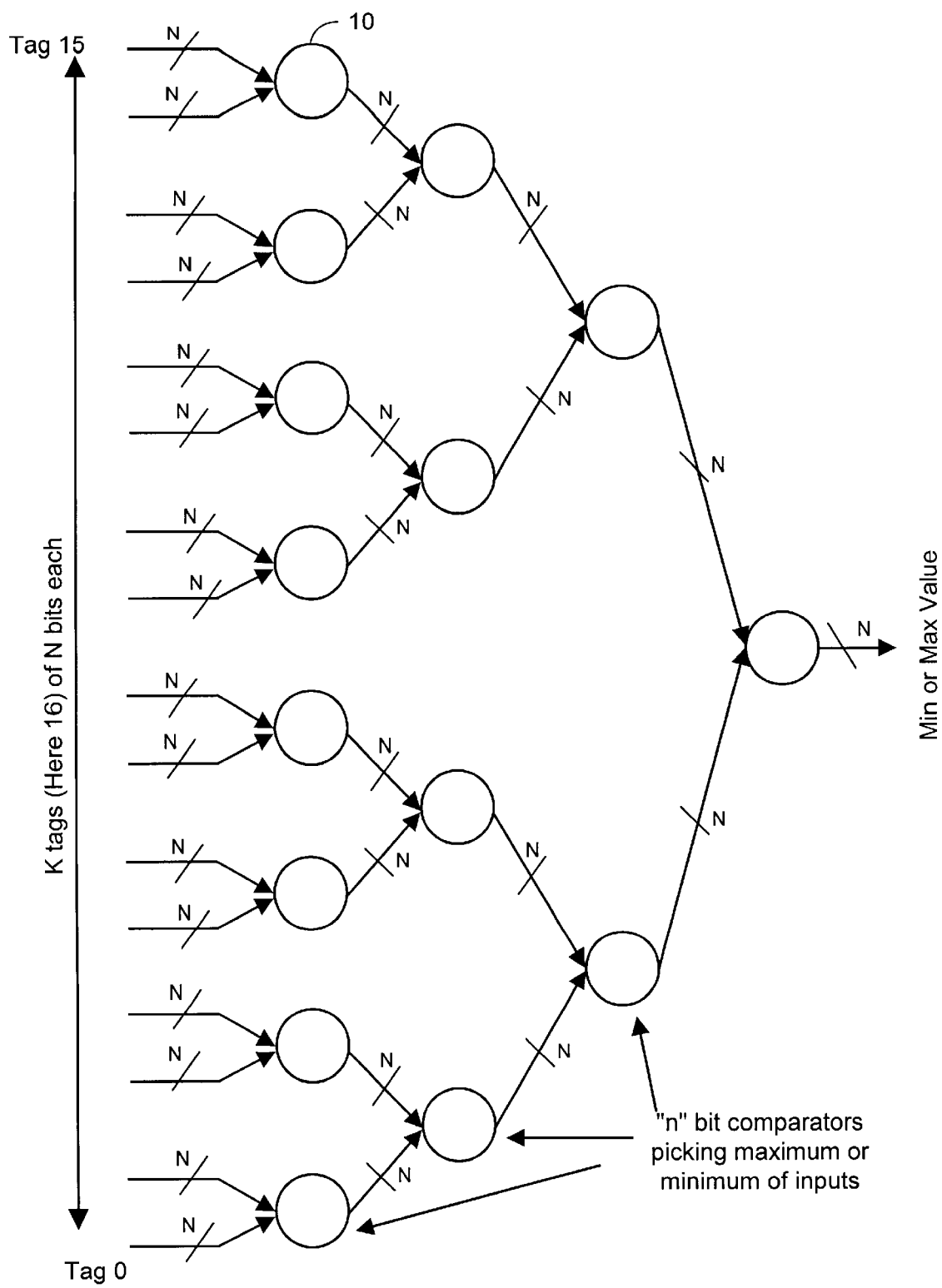
FIG. 1 illustrates comparator logic according to the prior art.
Figure 2:
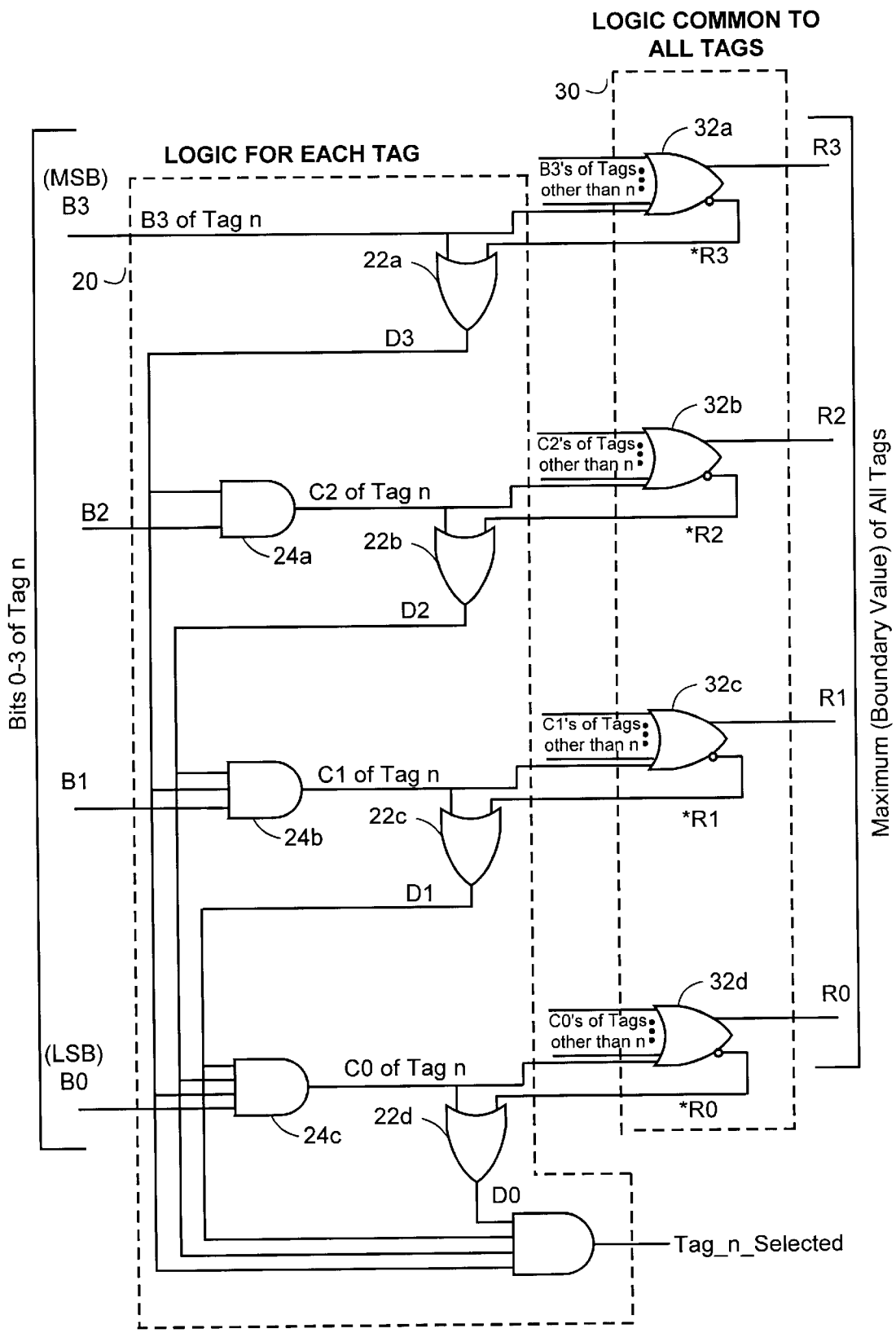
FIG. 2 illustrates an exemplary embodiment of a boundary value selector according to the present invention.

An example implementation of logic functions according to the present invention is shown in FIG. 2. FIG. 2 illustrates portions of logic for determining the boundary value of sixteen 4-bit tags and for indicating which tag or tags equal that value. Illustrated is logic slice 20, for input Tag n. It should be understood that according to the invention a similar logic slice 20 is provided for each of Tag0 to Tag15. It should also be understood that for each bit of Tag n, there is a two-input OR gate 22 and a multi-input AND gate 24 (for all but the MSB). AND gate 24 will have N inputs for the LSB of an N-bit compare and N-n inputs for each higher bit Bn.

FIG. 2 also illustrates logic block 30, which is common to all tags. Logic block 30 contains an OR gate 32 for each bit N in the input tags, with the input width of the OR gate determined by the number of tags being compared.

With positive logic for all signals, the logic shown in FIG. 2 will produce the maximum boundary value of the 16 tags at signals R3–R0 and will produce a high Tag_n_Selected signal for the one or more tags that match this maximum value.

Operation of the circuit may be understood by first considering OR Gate 32a, the output R3 of which is the most significant bit (MSB) of the maximum value. The 16 inputs $B3_{0-15}$ of 32a are simply the MSBs from the 16 tags. Output R3 will be 0 if and only if all the inputs of 32a are 0, and will be 1 if one or more inputs are 1. *R3 is the inverse signal of R3 and is used as described below.

OR Gate 32b produces output R2, which is the next significant bit of the maximum value. As with 32a, the inputs are 32b are based on $B2_{0-15}$ of the 16 tags. However, the inputs are not directly the bits from the tag, but are conditioned bits, labeled $C2_{0-15}$. Bits $C2_{0-15}$ are conditioned by the results of gates 32a, 22a, and 24a in each tag slice. AND gate 24a and OR gate 22a force C2 to 0 if B3 of Tag n is 0 and if B3 of any other Tag is 1. This effectively is a determination that Tag n is not the maximum tag and removes the bits of Tag n from further computations. The outputs of OR gates 22a–d, labeled D3–D0 may be thought of as propagation signals and are connected to all of the lower-order bit processing for that tag and that therefore a 0 output on any of the OR gates 22a–d will cause the lower bit position AND gates 24 and OR gates 22 to also go to 0, effectively removing Tag n from the rest of the compare.

However, if the results out of an OR gate 22 is 1, the subsequent lower bit is then compared with other tag's subsequent bits by OR gate 32b and the operation proceeds. If in a particular tag slice all the results of all the OR gates 22 are 1, then the output of AND gate 25 will be a 1, and the Tag__n__Selected signal for that tag will indicate that the tag is equal to the boundary value.

It will be apparent to those of skill in the art that the above described procedure can work for any bit width with additional gates such as 24c, 22d, and 32d for each additional bit, and with widths of gates such as 24b and 24c expanded to accommodate the outputs of OR gates 22 that precede them.

It will further be apparent that through Boolean inversions of the signals and logic gates, the procedure shown in FIG. 2 can be used to select the minimum boundary tags. It will also be apparent that any Boolean equivalent gates or groups of gates can be substituted for particular gates or groups of gates shown in FIG. 2.

Cascade Logic

Figure 3:
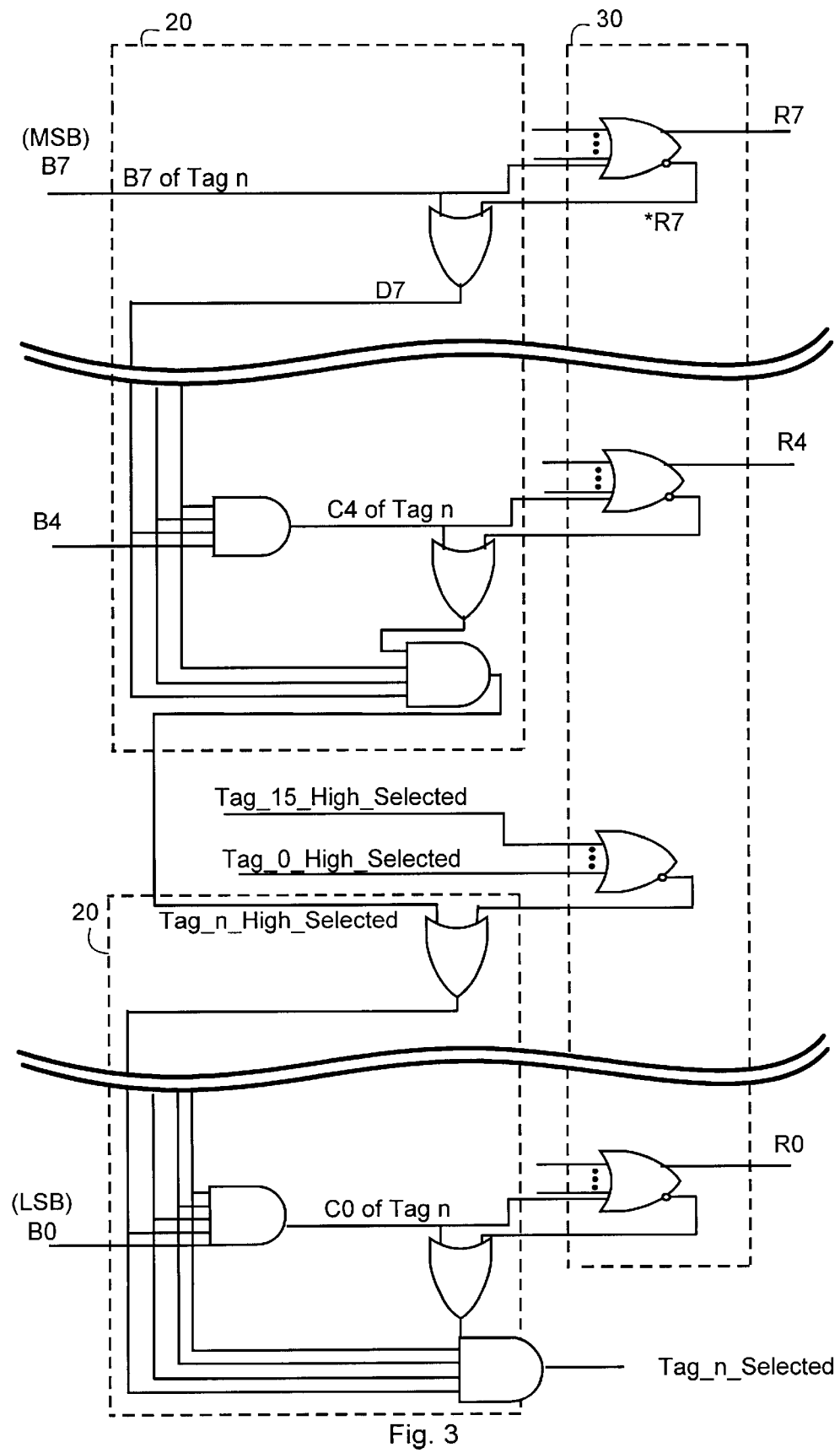
FIG. 3 illustrates an exemplary embodiment of a boundary value selector with a cascade architecture according to the present invention.

In an alternative embodiment, an example of which is illustrated in FIG. 3, wide-bit tags can be analyzed by cascading several logic slices 20, with the output of gate 25 serving as the MSB input for a next group of bits.

Use in a Communication Device

In a communications device, such as an ATM switch, the tags may represent a priority level and the device and method just discussed can be used to very quickly determine tags indicating the highest or lowest priority buffers or cells awaiting service. Aspects of one such communications device are described in METHOD AND APPARATUS FOR HIGH-SPEED, SCALABLE COMMUNICATION SYSTEM, the specification of which was filed on Dec. 11, 1997 as application No. 08/988,940 and which claims priority from provisional application No. 60/033,029 filed Dec. 12, 1996, both of which are incorporated herein by reference.

Figure 4:
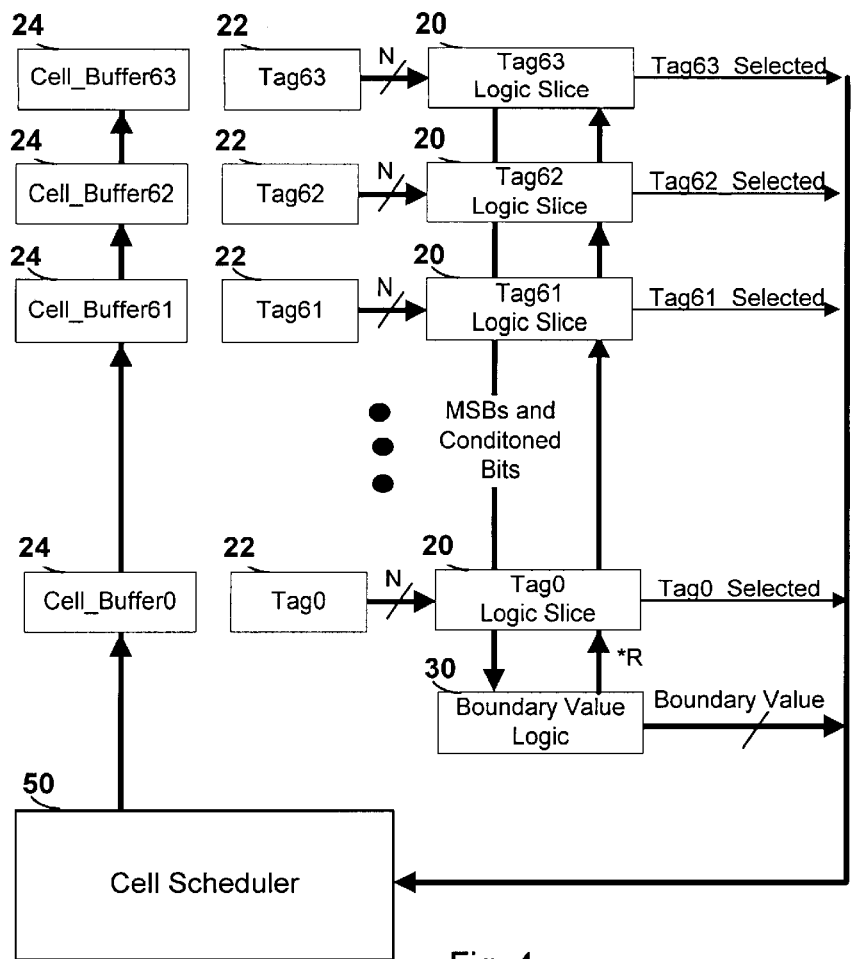
FIG. 4 illustrates an exemplary embodiment of an ATM cell scheduler using a boundary value selector according to the present invention.

FIG. 4 is a block diagram of a scheduler portion of a communication device according to an embodiment of the invention. Buffers 24 each have associated with them tags 22. Tags 22 are associated with logic slices 20, which, in cooperation with boundary value 30, produce Tag__Select signals that are use by scheduler 50 to select a buffer for processing.

Other Embodiments

The invention also may be embodied within the circuitry of an application specific integrated circuit (ASIC) or a programmable logic device (PLD). In such a case, the invention may be embodied in a computer understandable descriptor language which may be used to create an ASIC or PLD that operates as herein described.

Figure 5:
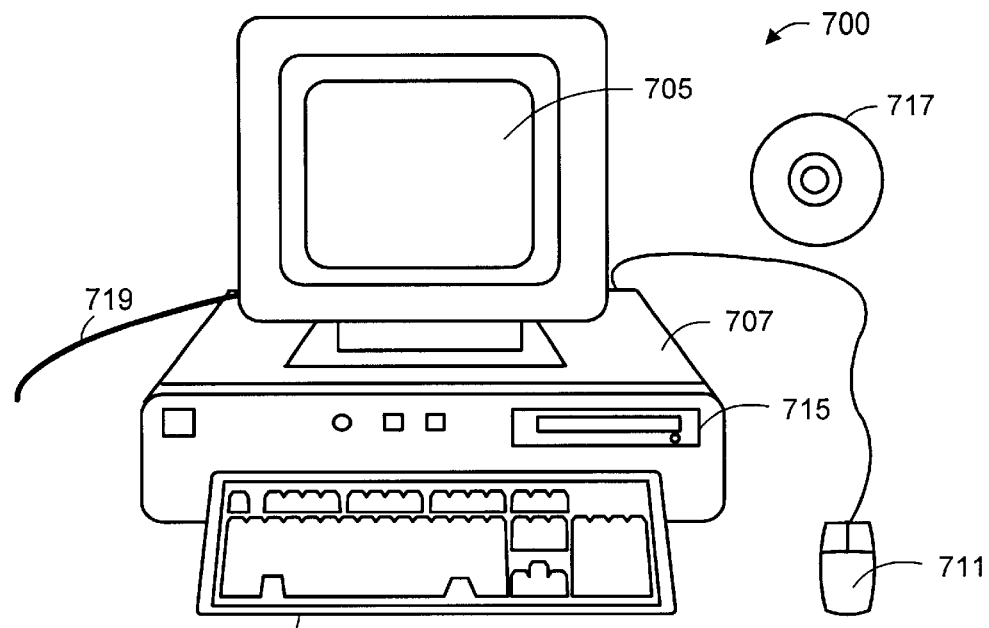
FIG. 5 is a diagram of a computer system which may be used to implement one embodiment of the invention.

In this embodiment, computer system 700, shown in FIG. 5, may be understood as a computer system for reading instructions from media 717 or network port 719. Computing system 700 can thereafter use those instructions for the manufacturing or configuration of an ASIC or PLD. A representation of such a system 700 in shown in FIG. 5, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention has now been explained with reference to specific embodiments. Other embodiments will be obvious to those with skill in the art. In particular the invention has application in many different networking environments and schemes. It is therefore intended that the invention not be limited except as indicated in the attached claims.

What is claimed is:

1. A device for selecting a boundary value from a plurality of input values each having a plurality of bits, the device comprising:

a plurality of logic slice blocks each associated with a different one of the plurality of input values, each logic slice block configured to generate an output signal that is asserted if the input value associated with that logic slice block is selected as the boundary value; and a common logic block configured to combine the bits of the plurality of input values to produce the boundary value.

2. The device according to claim 1 wherein each logic slice block comprises:

a first plurality of gates configured to combine the bits of the associated input value with propagation signals from higher order bits of the associated input value to produce conditioned input bits; and a second plurality of gates each configured to produce a propagation signal by combining corresponding conditioned bits of the input values.

3. The device according to claim 1 wherein each logic slice block comprises:

a propagation gate for each bit of that logic slice block's associated input value, said propagation gate indicating propagation if said input bit indicates propagation or none of the corresponding bits in other input values indicate propagation;

an input gate for each bit of that logic slice block's associated input value other than the most significant bit for conditioning the bit by logically combining the input bit with the results of all higher order propagation gates; and a select output gate for combining all of the propagation signals and generating a select signal.

4. The device according to claim 1 wherein a maximum input value is selected as the boundary value and wherein a logic slice block comprises:

an OR gate for each bit in the logic slice block's associated input value, said OR gate indicating propagation if a conditioned input bit or the most significant bit is 1 or if all corresponding conditioned bits in other input values are 0;

an AND gate for each bit, other than the most significant bit, in the logic slice block's associated input value for conditioning an input bit by producing a conditioned bit that is 1 only if an input bit is 1 and higher order propagation signals are 1; and an AND gate for generating a select output signal if higher order propagation signals are 1.

5. The device according to claim 1 wherein a maximum input value is selected as the boundary value and wherein said common logic block comprises:

an OR gate configured to compute the logical OR of the conditioned bits in a particular bit position of all input values;

an output indicating the maximum value bit value for a particular bit position; and an inverse output for producing a feedback signal to said logic slice blocks.

6. A fixed computer readable medium containing computer interpretable instructions describing a circuit layout for an integrated circuit that, when constructed according to said descriptions, configures a circuit to embody the apparatus described in claim 1.

7. A communication system service order controller comprising:

a plurality of buffers for storing data waiting to be serviced;

a plurality of tags associated with said buffers for indicating a service priority of said buffers;

a plurality of tag logic slice blocks associated with said tags for determining whether a tag is selected as a boundary value tag; and a scheduler that receives signals from said tag logic slice blocks and determines which buffers are serviced.

8. The device according to claim 7 wherein said tag logic slice blocks comprise:

an OR gate for each input bit in one of said tags, said OR gate generating a propagation signal indicating propagation if a conditioned input bit of said input bit is 1 or if all corresponding conditioned bits in other tags are 0;

an AND gate for each input bit, other than the most significant bit, in said one of said tags for conditioning an input bit by producing a conditioned bit that is 1 only if an input bit is 1 and all higher order propagation signals are 1; and an AND gate for generating a select output signal if all of the propagation signals are 1.

9. The device according to claim 7 further comprising a common logic block, said common logic block comprising:

an OR gate for computing the logical OR of the conditioned bits in a bit position of all tags;

an output indicating the maximum value bit value for a particular bit position; and an inverse output for producing a feedback signal to said tag logic slice blocks.

10. A method for selecting a buffer for servicing in a computation device comprising:

providing a plurality of buffers for storing data waiting to be serviced;

providing a plurality of tags associated with said buffers for indicating a service priority of said buffers;

providing a plurality of tag logic slices associated with said tags for determining whether a tag is selected as a boundary value tag, each tag logic slice generating a select signal indicating that that tag is selected as a boundary value tag; and using said select signals to determine a service order for said buffers.

\* \* \* \* \*